(12) United States Patent
Franklin et al.

(10) Patent No.: US 9,891,970 B2
(45) Date of Patent: Feb. 13, 2018

(54) TECHNIQUES TO SHARE APPLICATION DATA THROUGH A MESSAGING SYSTEM

(71) Applicant: Facebook, Inc., Menlo Park, CO (US)

(72) Inventors: Alexander Salem Franklin, Cupertino, CA (US); Matthew Steiner, Los Altos, CA (US); Jonathan David Perlow, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/844,231

(22) Filed: Sep. 3, 2015

(65) Prior Publication Data

US 2017/0068579 A1    Mar. 9, 2017

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |

(52) U.S. Cl.
CPC .............. *G06F 9/546* (2013.01); *G06F 9/466* (2013.01)

(58) Field of Classification Search
None
See application file for complete search history.

(56) References Cited

U.S. PATENT DOCUMENTS

| | | | |
|---|---|---|---|
| 2007/0266170 A1 | 11/2007 | Mockett | |
| 2008/0068995 A1* | 3/2008 | Skog | H04L 29/06 370/230.1 |
| 2009/0055511 A1* | 2/2009 | Berry | G06F 9/546 709/218 |
| 2009/0234935 A1 | 9/2009 | Watson et al. | |
| 2013/0111328 A1 | 5/2013 | Khanna et al. | |
| 2014/0156746 A1* | 6/2014 | Wheatley | H04L 67/22 709/204 |

(Continued)

OTHER PUBLICATIONS

Office Action received for U.S. Appl. No. 14/677,576, dated Jan. 6, 2017, 23 pages.

(Continued)

*Primary Examiner* — Chat Do
*Assistant Examiner* — William C Wood

(57) ABSTRACT

Techniques to share application data through a messaging system are described. In one embodiment, an apparatus may comprise a messaging component operative to receive a message package from a messaging service at a messaging client on a client device, the message package addressed from a source messaging account and addressed to a recipient messaging account, the recipient messaging account associated with the messaging client on the client device; extract an application data payload from the message package; receive an application service recommendation package from the messaging service, the application service recommendation package comprising an application service identifier; and an application interoperation component operative to transmit at least a portion of the application data payload to a recommended application service by the messaging client, the recommended application service identified by the application service identifier. Other embodiments are described and claimed.

17 Claims, 12 Drawing Sheets

(56) References Cited

U.S. PATENT DOCUMENTS

2014/0244786 A1 8/2014 Shapira et al.
2015/0278906 A1* 10/2015 Navani .............. G06Q 30/0631
　　　　　　　　　　　　　　　　　　　　　　705/26.7

OTHER PUBLICATIONS

Office Action received for U.S. Appl. No. 14/667,576, dated May 3, 2017, 27 pages.
O'Donoghue, Ruadhan, "App deep linking: Do we really need Facebook App Links and similar services", mobiForge, Jan. 22, 2015, 8 pages.

* cited by examiner

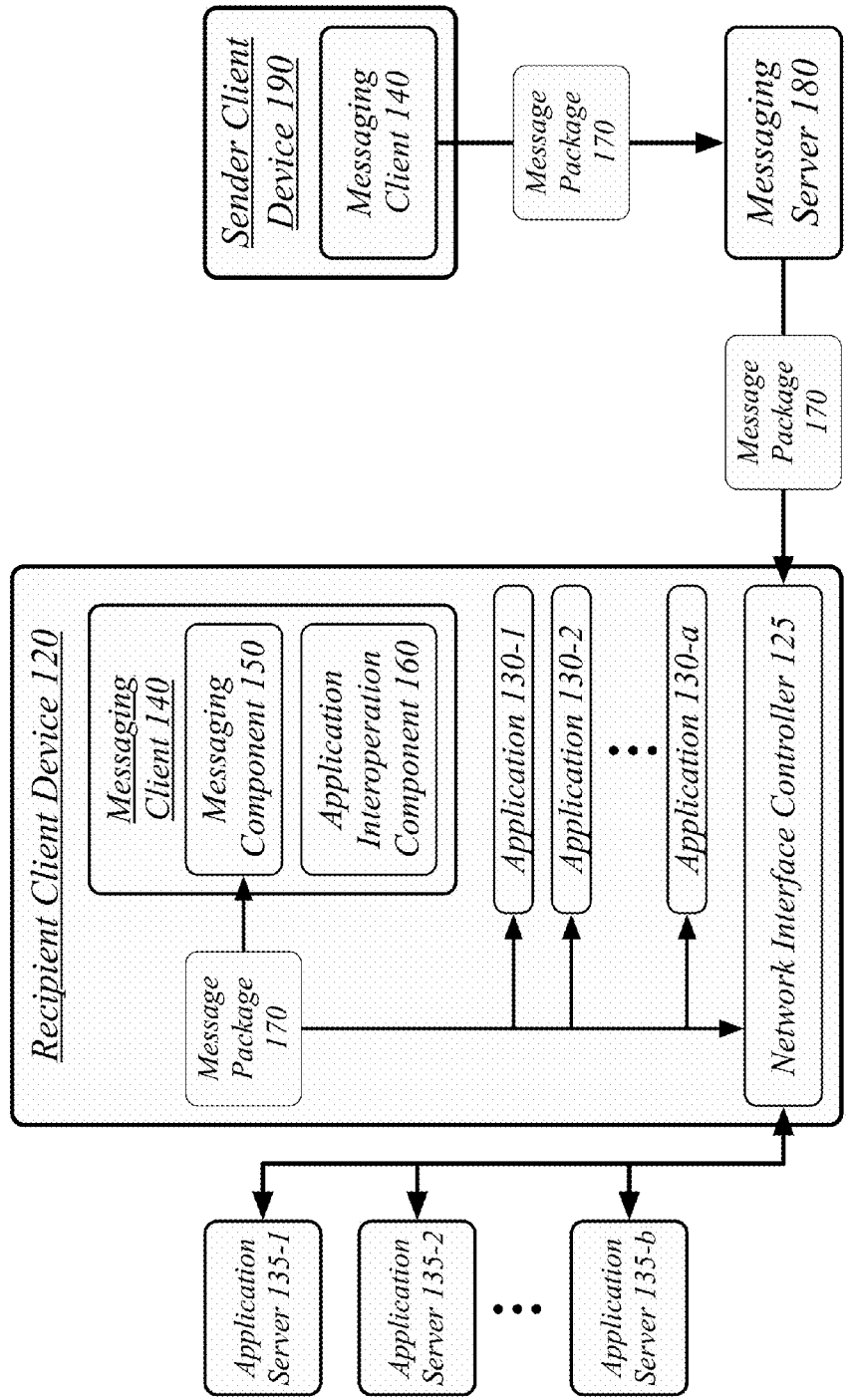

TECHNIQUES TO SHARE APPLICATION DATA THROUGH A MESSAGING SYSTEM

RELATED APPLICATIONS

This application is related to U.S. patent application Ser. No. 14/667,576, titled "Techniques to Share and Remix. Media Through a Messaging System," filed on Mar. 24, 2015, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging applications, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to share application data through a messaging system. Some embodiments are particularly directed to techniques to share application data through a messaging system to empower context-appropriate configuration of application services. In one embodiment, for example, an apparatus may comprise a messaging component operative to receive a message package from a messaging service at a messaging client on a client device, the message package addressed from a source messaging account and addressed to a recipient messaging account, the recipient messaging account associated with the messaging client on the client device; extract an application data payload from the message package; receive an application service recommendation package from the messaging service, the application service recommendation package comprising an application service identifier; and an application interoperation component operative to transmit at least a portion of the application data payload to a recommended application service by the messaging client, the recommended application service identified by the application service identifier. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 1 illustrates an embodiment of an application data messaging system.

DETAILED DESCRIPTION

Figure 2A:
FIG. 2A illustrates an embodiment of a user interface displaying an application interface.

Users may message with each other through a messaging system. Their conversations may include the discussion of media, entertainment, events, travel, future plans, and other elements of their lives. In some cases, the users may use application services—which may incorporate one or both of application software executing locally on the same device with which they are messaging and online services accessible from the same device with which they are messaging—to discover, retrieve, store, reserve, configure, or otherwise carry out actions related to such elements. These users may benefit from interoperation between a messaging client and the application services that provide functionality so as to empower them to share the functionality of the application services through the messaging client.

Of particular use may be context information related to elements shared using a messaging system. A media item may be associated with keywords describing its content. A reservation item may be associated with location information and time information describing where and when the reservation is for. A game item may be associated with state information describing the state of a multiplayer game. In general, application services may generate both a display-oriented item designed for display to and comprehension by a human user and context data for the display-oriented item expressing information related to the display-oriented item for use by the application service with reference to another user or by another application service altogether.

For example, media items may be shared with keywords, such that a user receiving a media item via a messaging service (e.g., image item, animated image item, video item, audio item) may be displayed the media item in a messaging client while the keywords for the media item are received and cached by the messaging client to aid media application services in perform media tasks related to the media item using the keywords. For example, a messaging client for a user account may receive from another user account a message containing an animated image of a corgi being vacuumed. The media item may be received in a message package along with an application data payload containing a listing of keywords, such as "corgi" and "vacuum." The receiving user might then select a media application service to look for their own image to share, either the same media application service as responsible for the image they received or a different one. This selected media application service may be sent the keywords so as to offer the user the opportunity to find related images.

Similar examples exist for other types of shared application data. A dinner reservation at a restaurant might be displayed in an attractive format that encapsulates the shared reservation for a human reader, while also being transmitted with context information for the reservation, such as a location (e.g., a street address) for the restaurant and a precise indication of a time for the reservation. This time and location information might be passed to a transportation application service to arrange for transportation to the specified location by the specified time. This transportation reservation might then also be shared via the messaging service, adding its application data to the shared application data payload and thereby allowing for additional interactions branching off from the sharing of the transportation reservation. A similar process may be performed in relation to airplane reservations, hotel reservations, or other shared items that have a relation to a time and a place. More broadly, similar processes may be performed in relation to any shared items so as to leverage context about those shared items in various application services.

As such, users may benefit from sharing information via a messaging system with the shared information comprising both human-readable elements and machine-readable elements, with the human-readable elements displayed for users of the messaging system and the machine-readable elements cached for use in configuring application services. As a result, the embodiments can improve the functioning of both a messaging system and application services accessible to the messaging system, improving the extendibility, interoperability, and modularity of online interactions.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for an application data messaging system 100. In one embodiment, the application data messaging system 100 may comprise a computer-implemented system having software applications comprising one or more components. Although the application data messaging system 100 shown in FIG. 1 has a limited number of elements in a certain topology, it may be appreciated that the application data messaging system 100 may include more or less elements in alternate topologies as desired for a given implementation.

A user's access to an application data messaging system 100 may be a messaging client 140 installed as a user application on a client device, such as on sender client device 190 or recipient client device 120, and executing locally on the client device. In some cases, the messaging client 140 may include other functionality. For example, the messaging client 140 may be a front-end to a social-networking service, providing messaging services in association with the social-networking service. In many cases, this client device may be a smartphone, cell phone, or other mobile device using a mix of Wi-Fi and cellular data networks to access the Internet and networked resources, though it will be appreciated that any form of network access may be used. For example, one device may tether to another, such as a smart watch tethering to a Internet-capable device (e.g., mobile phone, personal computer) or a mobile phone tethering to a personal computer. The client device may execute a plurality of applications, including the messaging client 140, one or more applications 130, and other user applications. In other embodiments, however, the client device may comprise a personal computer device, a portable digital assistant, a tablet device, or any other form of computing device. Similarly, in some situations and embodiments, a user may access the application data messaging system 100 via a web portal, with the messaging client 140 executing as a web-based application.

The client device may communicate with other devices using wireless transmissions to exchange network traffic. Exchanging network traffic, such as may be included in the exchange of messaging transactions, may comprise transmitting and receiving network traffic via a network interface controller 125 (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 135 may be used for the network activities of the embodiments described herein, including the interoperation of the applications 130, application servers 135, messaging client 140, and messaging server 180 through network communication. For example, the messaging client 140 transmitting a message package 170 to a messaging server 180 may be interpreted as using the network interface controller 125 for network access to a communications network for the transmission of the message package 170.

The applications 130 may comprise locally-executing applications providing service functionality to a user of the client device. The applications 130 may comprise local front-ends for application services, such as may be provided in conjunction with the application servers 135. The applications 130 may comprise applications operative to interoperate with the messaging client 140.

In some cases, one or more of the applications 130 may comprise media applications for one or more of searching media content, discovering media content, sharing media content, storing media content, accessing media content, modifying media content, and combining media content.

Each of the media applications may be associated one or more media services, either a dedicated media application for a particular media service or a media application interoperating with a plurality of media services. Each of the media services may provide one or more media servers, such as one or more of the application servers 135, for storing, retrieving, and generally exchanging media content. Media servers may distribute media repositories to local media applications comprising bundles of media packages, wherein each of the media packages comprises a media element (a particular instance of media content) and associated information. The associated information for a media element in a media package may include an attribution record, the attribution record encapsulating information about the media service, media application, and other sources of the media element.

Content received from an application may include an inter-application link, the inter-application link identifying content within the content space of the related application and/or application service and thereby serving as a deep link to the content within the application and/or application service. The inter-application link may empower an application or application server to navigate to a particular page, view, or other repository of information for the associated content. The inter-application link may be universal across client devices with regards to a particular media application/media service. The inter-application link may therefore allow a user to share an application item with sufficient contextual information to empower the receiving user to access the application item within its context of its associated application/application service. In various cases, an application item may comprise a media item, a reservation item, an event item, or any other item related to the operation of an application and/or application service.

The messaging client 140 may comprise an application interoperation component 160. The application interoperation component 160 may be generally arranged to manage application data items and data used for the interoperation with applications and application services within the context of the messaging client 140. The application interoperation component 160 may operate as a crossroads for data from the plurality of applications 130. The application interoperation component 160 may empower the messaging client 140 to interoperate with the plurality of applications 130, such as by receiving application data from the applications 130, submitting application data to the applications 130, invoking the viewing of existing application data within the applications 130, and moving application data from one of the applications 130 to another.

The messaging application 130 may comprise a messaging component 150. The messaging component 150 may be generally arranged to provide messaging services to a user of the client device. Messaging services may comprise the reception of messages, the sending of messages, the maintenance of a history of messages exchanged, and other messaging-related activities. User of the messaging client 140 may be empowered to engage in messaging conversations with a plurality of other users in both private user-to-user conversations, in private group conversations between three or more users, and in public conversations generally open to the messaging community. The messaging component 150 may interoperate with the application interoperation component 160 to enrich any of these messaging conversations with the application data management by the application interoperation component 160.

The application data messaging system 100 may include a messaging server 180 from among a plurality of messaging servers. The messaging server 180 may operate as an intermediary between the messaging endpoints of users of the application data messaging system 100. The messaging server 180 may track the current network address of a user's active messaging endpoint or endpoints, such as when they change network (e.g., a mobile client device moving between Wi-Fi networks, between cellular data networks, and between Wi-Fi and cellular data networks). The messaging server 180 may queue messages for messaging endpoints when they are offline or otherwise not accepting new messages. The messaging server 180 may provide an ordering on messages for a particular user so as to provide consistency in the flow of communication between the potentially multiple messaging endpoints that a user might use. The messaging server 180 may store a messaging history for each user so as to provide access to previously-sent or received messages for a user. The messaging history may include media exchanged between users using the application data messaging system 100.

The messaging component 150 may transmit and receive message packages with a messaging server 180 for delivery from or to one or more other users of the application data messaging system 100. A message package 170 may comprise delivery information, such as one or more delivery user identifiers identifying one or more users for the message package 170. The messaging server 180 may receive the message package 170 from a sender client device 190 and deliver it to a messaging endpoint—such as an installation of the messaging client 140 on the recipient client device 190—associated with a delivery user account identified by a delivery user identifier for the message package 170.

Messages transmitted via the messaging server 180 may include one or more media elements. Where a media element for transmission is already stored on the messaging server 180 or on a media server accessible to the application data messaging system 100 the messaging server 180 may refrain from transmitting the media element to the recipient client device 120. The messaging client 140 may generate or retrieve a hash of a media element and transmit the hash to the messaging server 180 to determine whether a media element is already available in the application data messaging system 100. The messaging server 180 may indicate whether a media element is already available and therefore should not be re-uploaded. The messaging server 180 may request an upload of a media element from the client device when a media element is not determined to be available based on the hash. Similarly, where a media element is represented as a uniform resource locator (URL) to a network-accessible source, the uploading of a media element may be avoided. These techniques may serve to reduce the bandwidth used in sharing media elements. By using the unified platform of the media messaging system 110, the bandwidth usage of sharing media elements may be reduced as the media messaging system 110 has visibility into the network locations of network-accessible media elements and may store media elements from a plurality of media application sources using hashing to eliminate duplicate uploads. This reduction of bandwidth usage may increase the speed of media sharing, reduce the usage of a user's bandwidth allocation from a cellular provider, and eliminate the battery usage that may be involved in performing the upload of a application item, thereby reducing the overall battery usage for media sharing.

A application item may be managed and manipulated by the application data messaging system 100 according to a variety of techniques in various embodiments. In some cases, a media element may be directly stored as computer data representation within the media package 105. For example, an image media element may be stored as a Joint Photographic Expert Group (JPEG) digital image file within the media package 105. In other cases, a media element may be stored as a reference within the media package 105, the reference comprising a resource locator—such as a URL— providing a network-accessible address for a media element. As such, while the recipient client device 120 may cache an instance of a media element on the client device for local access, a media element may be shared using the resource locator so as to avoid the client device uploading a media element during transmission to the second client device 190. Instead, the messaging client 140 on the second client device 190 may receive a media element as the resource locator and fetch an instance of a media element after reception resource locator. This eliminates the use of upload bandwidth for the client device without potentially leverage the storage and bandwidth of the application servers 135 for a second client device to download a media element. Alternatively, the messaging server 180 may cache or retrieve a media element and include it with the message package 170 when delivering the message package 170 to the second client device. It will be appreciated that, in general, any known technique for formatting and storing media content may be used. In some cases, the application data messaging system 100 may re-size, re-code, change the format, or change the quality level of a application item prior to uploading or prior to transmission to a destination second client device. This may be performed to reduce the storage space used in storing a application item or the bandwidth used in uploading or downloading a media element.

The application data messaging system 100 may use knowledge generated from interactions in between users. The application data messaging system 100 may comprise a component of a social-networking service and may use knowledge generated from the broader interactions of the social-networking service. As such, to protect the privacy of the users of the application data messaging system 100 and the larger social-networking service, application data messaging system 100 may include an authorization server (or other suitable component(s)) that allows users to opt in to or opt out of having their actions logged by the application data messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the application data messaging system 100 and other elements of a social-networking service through blocking, data hashing, anonymization, or other suitable techniques as appropriate. For example, while interactions between users of a social-networking service and the social-networking service may be used to learn media content preferences and the relationship between preferences for different pieces of media content, these interactions may be anonymized prior to or as part of the learning process.

FIG. 2A illustrates an embodiment of a user interface 200 displaying an application interface 205. The user interface 200 may comprise a user interface of the sender client device 190 being used to perform a task with an application service that will then be shared using the application data messaging system 100.

The application interface 205 may correspond to a portion of a user interface for a restaurant reservation application. A restaurant reservation application may provide access to a reservation application service in which reservations may be made with a reservation server system. The application interface 205, indicating a reservation that has been made, may be reached through the use of the restaurant reservation application to select a restaurant, number of people for whom the reservation is to be made, and a time (e.g., date and time of day) for the reservation.

The application interface 205 may include controls for the operation of the reservation application by the user of the sender client device 190. A change control may empower the user of the reservation application to change the details of their reservation. A cancel control may empower the user to cancel their reservations. Other controls may be provided in various embodiments.

An application interface 205 may include an application share control 210 empowering a user of an application to share an application item, such as the restaurant reservation depicted in FIG. 2A. The illustrated example application share control 210 is a messaging-application-specific application share control specifically associated with a particular messaging application, such as the messaging client 140. Selecting the application share control 210 may therefore directly launch (e.g., bring to the foreground) the messaging client 140 and transfer the application item to the messaging client 140.

In other embodiments, a general application share control—a non-application-specific application share control— may be used in the application. Selecting this general application share control may initiate an interface offering multiple ways to share the application item, such as email, the Multimedia Message Service (MMS) extension of the Short Message Service (SMS) system, messaging applications including the messaging client 140 associated with the application data messaging system 100, and other methods sharing.

In some cases, a application showing a messaging-application-specific application share control 210 specifically associated with a particular messaging client 140 may correspond to a messaging-application specific version of the application. For example, the TABLE GRABBR application may release a version of the TABLE GRABBR application specifically designed for integration with the messaging client 140 for the application data messaging system 100. While the messaging client 140 may be operative to accept content from both messaging-application-specific applications and non-messaging-application-specific applications, messaging-application-specific applications may be preferred by the messaging client 140.

Figure 2B:
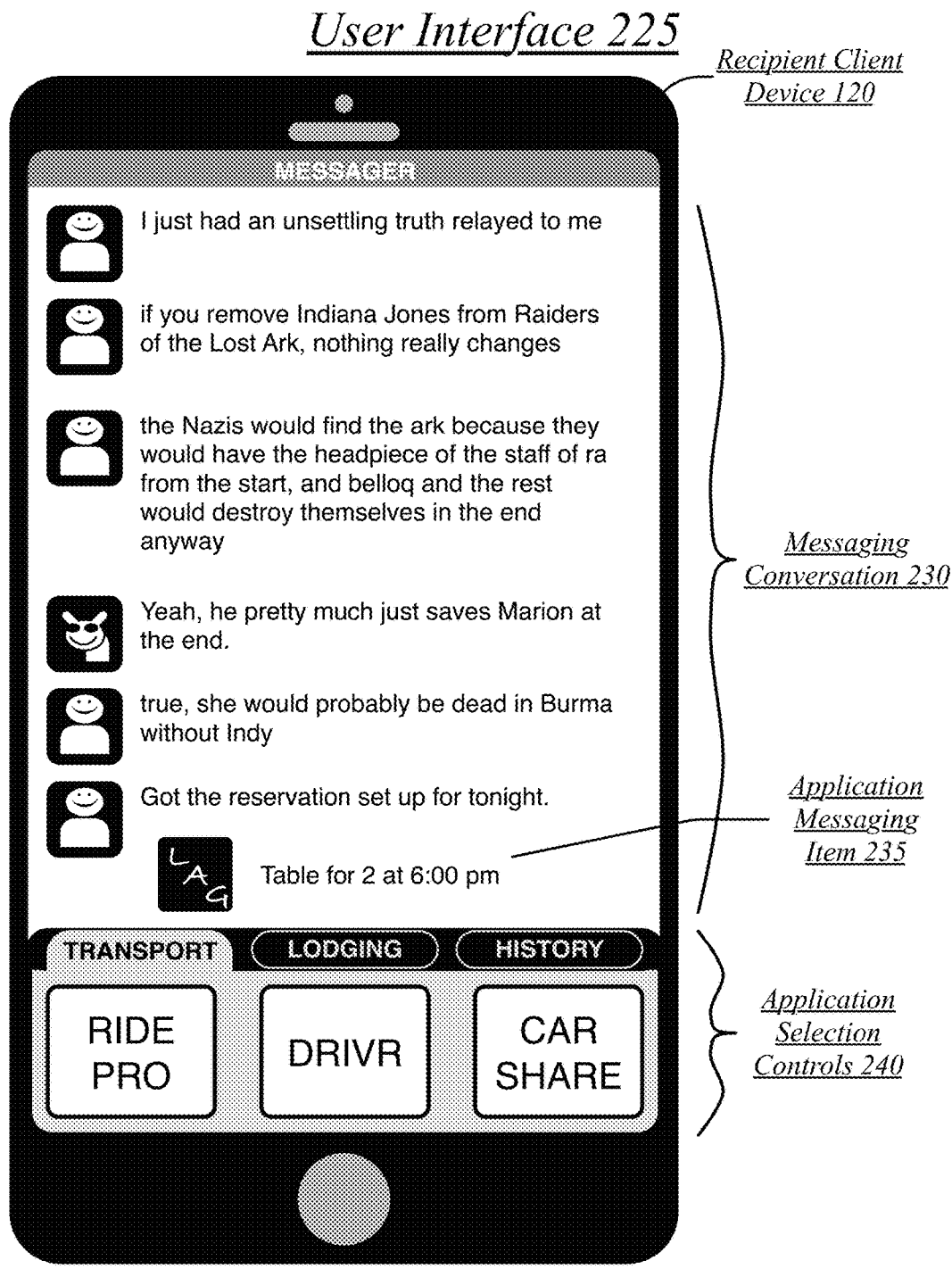
FIG. 2B illustrates an embodiment of a user interface displaying a messaging conversation with an application messaging item.

FIG. 2B illustrates an embodiment of a user interface 225 displaying a messaging conversation 230 with an application messaging item 235.

In the illustrated embodiment of FIG. 2B, the messaging client 140 is displaying a messaging conversation 230. The illustrated messaging conversation 230 corresponds to a private messaging conversation between two users. Each user is visually represented in the messaging conversation 230 by a user avatar associated with their user account for the messaging system.

The illustrated messaging conversation 230 includes a user message indicating that a reservation was set up for that night. The user-created text message is accompanied by an application messaging item 235 comprising a human-readable portion of an application data item received from the reservation application of FIG. 2A.

In some embodiments, the application messaging item 235 may be displayed in association with an attribution display element, the attribution display element visually communicating the particular application from which the application messaging item 235 was shared. The attribution display element may further comprise a control for accessing the application messaging item 235 within the attributed application with which the application messaging item 235 is associated.

The user interface 225 includes application selection controls 240. In some cases, application selection controls 240 may be displayed in response to user selection of the application messaging item 235 to provide options for handling the application messaging item 235. In other cases, an application launch control may be displayed as part of the messaging interface, with selection of the application launch control providing options for dealing with any portion of the application data payload. Where the application selection controls 240 are displayed in response to a user selection of an application messaging item 235, the suggested applications may be selected according to a portion of the application data payload corresponding to the application messaging item 235, as in associated machine-oriented data attached in relation to the human-readable application messaging item 235.

In the illustrated embodiment, the application selection controls 240 comprise a transport section, lodging section, and history section, the transport section and lodging section comprising selected in response to the application messaging item 235 being associated with an application data item in the application data payload containing time and place information, in this case time and place information for a restaurant reservation. An application may be indicated in the display via text, image, icons, or any other display technique.

The user of the messaging application 140 may select one of the application selection controls 240 to initiate the launching of an application. For example, the "DRIVR" icon may be selected to launch the "DRIVR" application on the recipient client device 120. In some embodiments, only applications available on the recipient client device 120 may be displayed. In other embodiments, additional suggested applications may be displayed, with the messaging client initiating the installation of an additional suggested application if selected by the user.

Figure 2C:
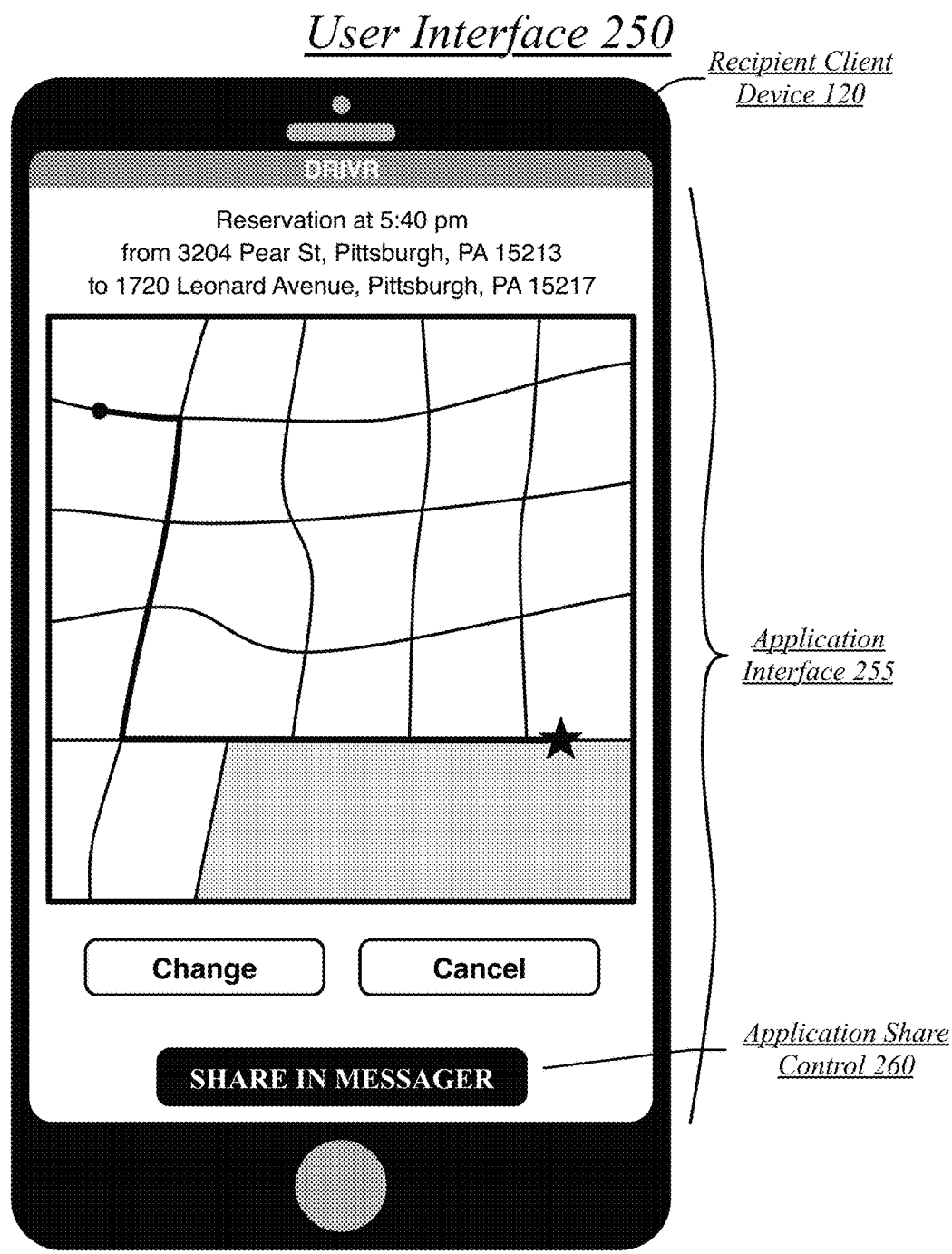
FIG. 2C illustrates an embodiment of a user interface displaying an application interface incorporating shared application data.

FIG. 2C illustrates an embodiment of a user interface 250 displaying an application interface 255 incorporating shared application data.

User interface 250 may comprise an application interface 255 corresponding to a transportation application. The transportation application may have received an application data payload and/or application data item, the application data item indicating an address and a time. The transportation application may use the date and time to configure a transportation service for the user of the recipient device 190, in this case transportation to a reservation. The displayed application interface 255 may correspond to the user of the recipient device 190 having configured various options for the transportation, such as confirming a pick-up location—as may be determined as a current location of the user—and pick-up time. In the illustrated example of FIG. 2C, the application interface 255 includes a display of the pick-up location, drop-off location, and a map of the route to be taken between the pick-up location and drop-off location.

The user may be aided in the configuration of the transportation through the transportation application receiving the destination address, the destination address added to the application data payload by the messaging client 140 on the sender client device 120 as received from a reservation application. The transportation application may receive the destination address and automatically configure the destination address for a trip based on the received destination address. In some cases, such as where an immediate trip is being requested, the time of the reservation may not be used by the transportation application, with instead only the destination address being used from a received application data item.

The application interface 255 may also include an application share control 260 substantially similar to the application share control 210 described with reference to FIG. 2A. The application share control 260 may be used to share the configured transportation in a messaging conversation, such as may be beneficial where the transportation service itself is to be shared with the partner in the messaging conversation.

Figure 3:
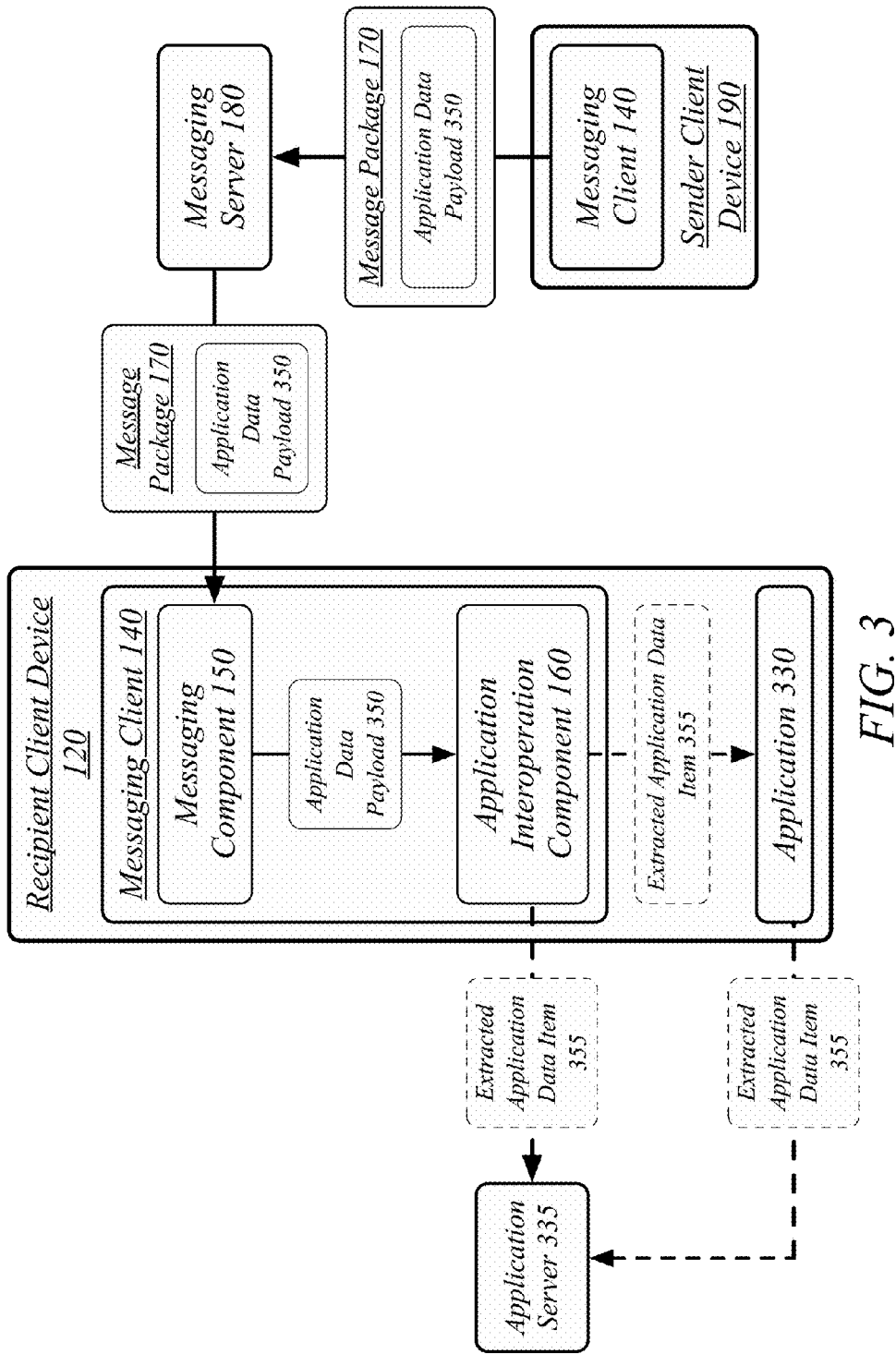
FIG. 3 illustrates an embodiment of a messaging client processing an extracted application data item from an application data payload.

FIG. 3 illustrates an embodiment of a messaging client 140 processing an extracted application data item 355 from an application data payload 350.

A messaging component 150 may be generally arranged to receive a message package 170 from a messaging service 180. A message package 170 may be addressed from a source messaging account and addressed to a recipient messaging account. The recipient messaging account may be associated with the messaging client 140 on the recipient client device 120. The messaging component 140 being arranged to receive the messaging package may comprise the message component 150 receiving an incoming network communication from the messaging server 180 and delineating the contents of the incoming network communication according to a predefined communication scheme.

The messaging component 150 may extract an application data payload from the message package 170, the application data payload comprising one or more application data items. The messaging component 150 extracting an application data payload from the message package 170 may correspond to the messaging component 150 processing a particular field or fields of the message package 170. The application data payload 350 may comprise, without limitation, at least one of time information, location information, event information, and reservation information. The application data payload 350 may comprise a pointer to a playlist for media content to empower the shared playing of a playlist. The application data payload 350 may comprise a cursor or time indicator for a current position in the playback of media content to empower the synchronized viewing and/or listening to media content. The application data payload 350 may comprise a pointer to an online game and/or game state information for a game.

The messaging component 150 may also receive an application service recommendation package from the messaging service 180, the application service recommendation package comprising an application service identifier. The application service identifier may indicate a recommended service for use in handling the application data payload 350 and/or the most-recent application data item as may correspond to the extracted application data item 355. In some embodiments, the application service recommendation package may be received as part of the message package 170, such that receiving an application service recommendation package comprises receiving the message package 170 and extracting the application service recommendation package from the message package 170.

The application interoperation component 160 may display a service recommendation on a display device for the recipient client device 120, the service recommendation corresponding to the application service identifier. The service recommendation may comprise one of the applications displayed for launching as described with reference to the application selection controls 240 of FIG. 2B. The application interoperation component 160 may receive a user command, the user command indicating selection of the service recommendation.

In some embodiments, an application service recommendation package may comprise a plurality of application service identifiers including the application service identifier, wherein each of the application service identifiers embodies a recommendation of a particular application service. For example, multiple transportation applications may be recommended, as in the illustrated embodiment of FIG. 2B. In some cases, a plurality of recommendations may be divided into categories. The application interoperation component 160 may display a plurality of service recommendations on the display device for the client device, the plurality of service recommendations corresponding to the plurality of application service identifiers and receive a user command, the user command indicating selection of the service recommendation corresponding to the recommended application service.

An application service recommendation or a plurality of application service recommendations may be specified by the messaging service 180 based on the application data payload 350, and may be specified in particular based on the extracted application data item 355. The selection of one or more service recommendations by the messaging server 180 may be performed in response to a type or types of information recorded in the application data payload 350 and/or the extracted application data item 355. Various application services may be associated by the messaging system with particular types of information—such as address information, time information, media keywords, etc.—and the application services selected based on their associated type or types of information matching the type or types of information stored in the application data payload 350 and/or extracted application data item 355. The particular matching application services recommended may further be selected and/or ranked based on a history of the user of the recipient client device 120, such as may indicate preferences for particular applications through previous use of the particular applications.

For instance, the application data payload 350 may comprise at least time information and location information, with the recommended application service comprising a transportation application service. The application service recommendation package comprising a transportation application service recommendation may therefore be based on the application data payload 350 comprising the time information and the location information. Similarly, the message package 170 may comprise a media item, with the application data payload 350 comprising keyword information for the media item. The recommended application service may therefore be a media application service, such that transmitting the application data payload to the media application service configures the media application service for the retrieval of a plurality of media items based on the keyword information. In another instance, the application data payload 350 may comprise gameplay information for a game application, the recommended application service comprising the game application. The gameplay information may be operative to configure the game application as to participation by the sender messaging account in gameplay of the game application.

In some cases, particularly for the sharing of media items, the same application service may be recommended as generated the extracted application data item 355. As such, the portion of the application data payload 350 transmitted to a recommended application service may have been generated by the recommended application service operating for the source messaging account.

The application interoperation component 160 may transmit at least a portion of the application data payload 350, such as the extracted application data item 355, to a recommended application service, the recommended application service identified by the application service identifier. The application data payload 350 may be operative to configure the recommended application service as to context of a messaging conversation between the source messaging account and the recipient messaging account. In some cases, transmitting the application data payload 350 or the portion of the application data payload 350 to the recommended application service may comprise performing an inter-application transmission internal to the recipient client device 120, the inter-application transmission transmitted to a locally-executing application 330. In other cases, transmitting the application data payload 350 or the portion of the application data payload 350 to the recommended application service may comprise performing a network transmission to an application server 335 for the recommended application service.

In some embodiments, application data may be passed with an identifier for one or more of the participants in a messaging conversation. In some embodiments, the identifier may be a global identifier for the user with the messaging system. In another embodiment, the identifier may be an application-scoped identifier specific to the application service to which the application-scoped identifier is passed, the application-scoped identifier traceable back to the global identifier by the messaging system but not by the application service, so as to protect the privacy of the user of the messaging service 180. A number of the identifiers may be used by the application service to configure service, such as a transportation service knowing how many people are to be transported based on the number of identifiers received. The number of identifiers may be arbitrarily large, such as in a group conversation.

Figure 4:
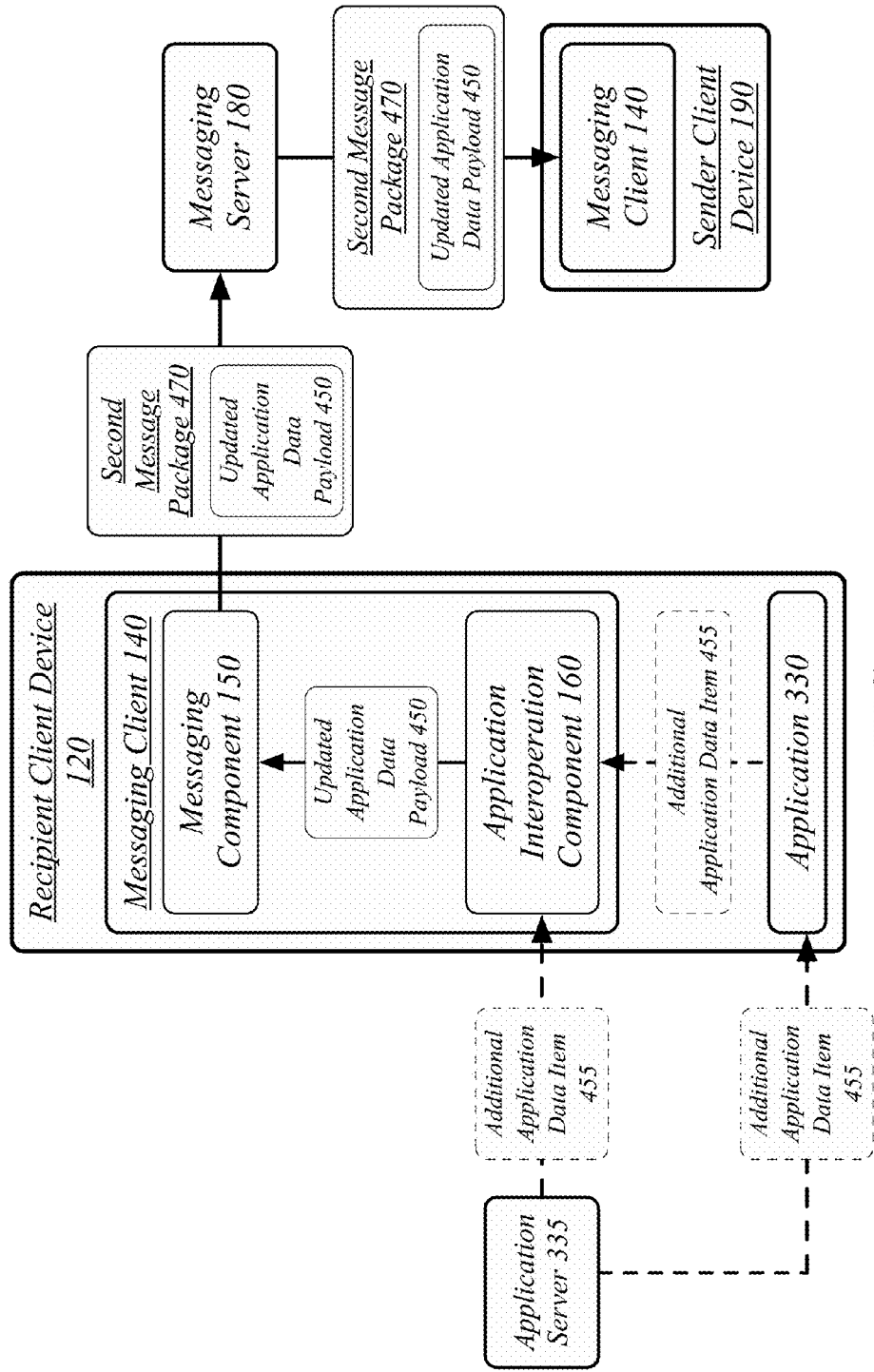
FIG. 4 illustrates an embodiment of an additional application data item being added to an application data payload to generate an updated application data payload.

FIG. 4 illustrates an embodiment of an additional application data item 455 being added to an application data payload 350 to generate an updated application data payload 450.

An application data item may be received from an application service. In some cases, the application data item may comprise an additional application data item 455 received from a recommended application service in response to transmitting at least the portion of the application data payload 350 to the recommended application service. As illustrated in FIG. 4, in some cases an additional application data item 455 may be received from a locally-executing application on the same recipient client device 120 via inter-application communication, and in other cases the additional application data item 455 may be received from the application server 355 without a local installation of an application 330 acting as an intermediary. The messaging component 150 may transmit a second message package 470 to the messaging service, the second message package 470 including the additional application data item 455 in an updated application data payload 450.

In some embodiments, an application data payload may comprise only the most recent application data item received from an application service. In other embodiments, the application data payload may include a chain of application data items. Where a chain of application data items is supported, more than one application data item may be included in the application data payload where an additional application data item 455 is temporally related and/or information-type related to one or more application data items in the existing application data payload 350.

When an additional application data item 455 is received, the application interoperation component 160 may determine whether the existing application data item or application data items in the existing application data payload 350 are temporally related to the additional application data item 455, such as by determining whether the time of the reception of the additional application data item 455 is sufficiently close to the time of the reception of the existing application data item(s) to indicate that they are related, as may be determined by through a threshold amount of time or other technique. Similarly, when an additional application data item 455 is received, the application interoperation component 160 may determine whether the existing application data item(s) in the existing application data payload 350 are information-type related to the additional application data item 455, such as by determining whether they correspond to the same type of information: time information, location information, time and location information, event information, reservation information, media keyword information, etc.

The application interoperation component 160 may include the existing application data item(s) in an updated application data payload 450 where the additional application data item 455 is temporally-related, is information-type related, or is both temporally-related and information-type related depending on the embodiment. In other embodiments, the updated application data payload 450 transmitted by the messaging client 140 may always only comprise the additional application data item 455, with the messaging server 180 determining whether to include the existing application data item(s) for transmission to the receiving client device—the original sender client device 190 in the illustrated embodiment of FIG. 4—based on a similar analysis as described with reference to the application interoperation component 160, with the messaging server 180 including cached copies of the existing application data item(s) in the updated application data payload 450 when it is determined to do so.

As such, in some embodiments, the application data payload may grow with added additional application data items so long as the additional application data items being added remain temporally and information-type relevant to the chain of application data items in the application data payload. The application data payload may be reduced to only a single application data item if the chain is broken either temporally or in regards to information-type. In these embodiments, the entire application data payload may always be passed to the receiving application service as any non-relevant application data items would be excluded from the application data payload. As such, a transportation service may receive a chain of location and/or time information, as may represent the location of multiple destinations and/or users, thereby empowering the transportation service to go between multiple destinations and/or pick-up and drop-off multiple users. Similarly, a media service may receive a chain of keywords and configure its search of media content based on the chain of keywords, thereby incorporating the keywords for a chain of media being shared between users of a messaging system.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
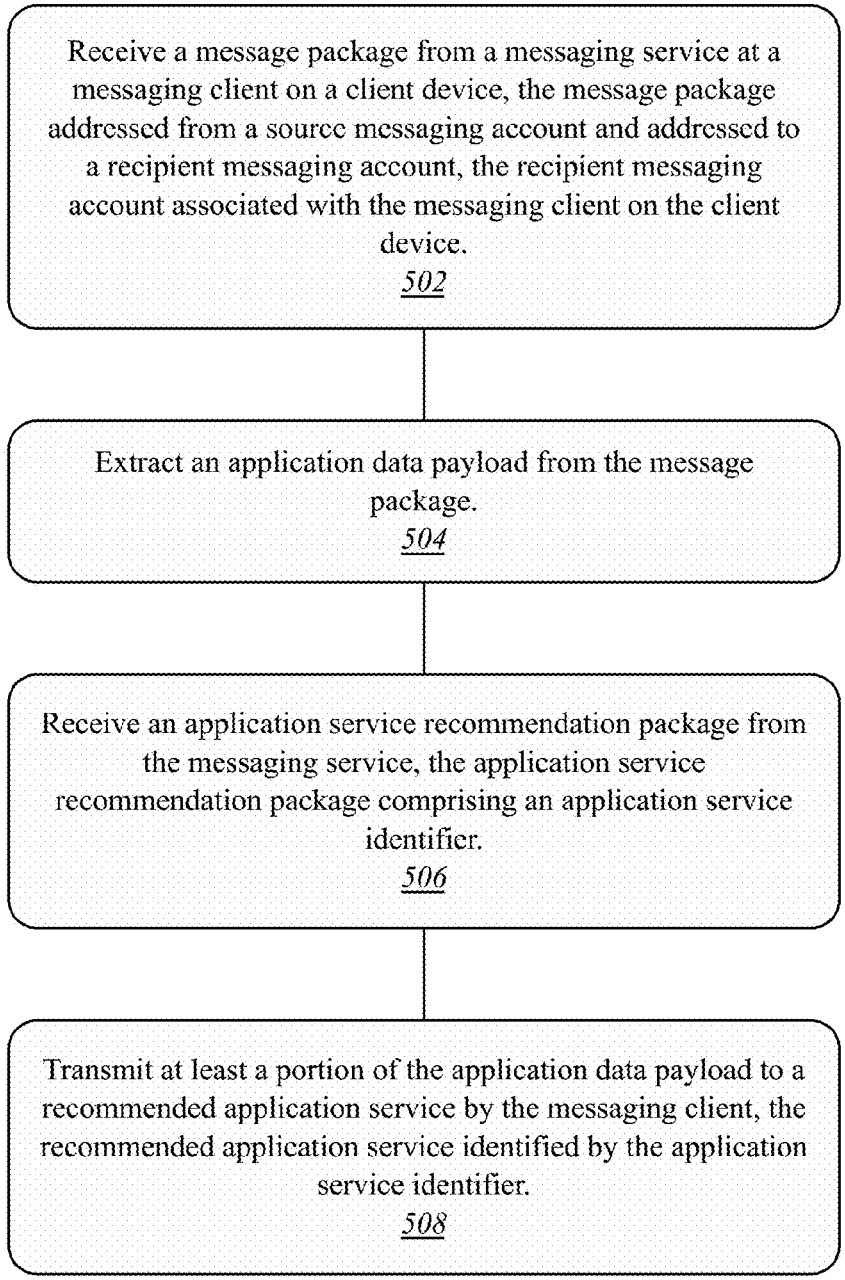
FIG. 5 illustrates an embodiment of a logic flow for the system of FIG. 1.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive a message package from a messaging service at a messaging client on a client device, the message package addressed from a source messaging account and addressed to a recipient messaging account, the recipient messaging account associated with the messaging client on the client device at block 502.

The logic flow 500 may extract an application data payload from the message package at block 504.

The logic flow 500 may receive an application service recommendation package from the messaging service, the application service recommendation package comprising an application service identifier at block 506.

The logic flow 500 may transmit at least a portion of the application data payload to a recommended application service by the messaging client, the recommended application service identified by the application service identifier at block 508.

The embodiments are not limited to this example.

Figure 6:
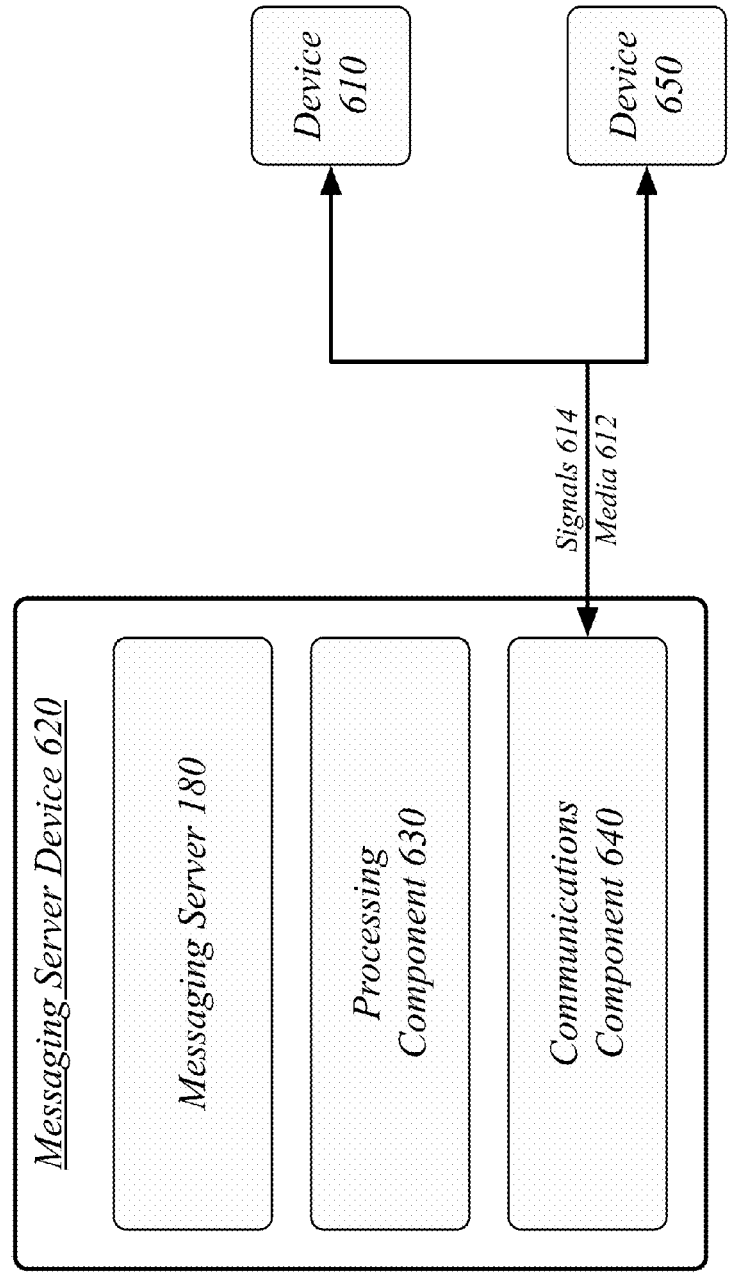
FIG. 6 illustrates an embodiment of a centralized system for the system of FIG. 1.

FIG. 6 illustrates a block diagram of a centralized system 600. The centralized system 600 may implement some or all of the structure and/or operations for the application data messaging system 100 in a single computing entity, such as entirely within a single messaging server device 620.

The messaging server device 620 may comprise any electronic device capable of receiving, processing, and sending information for the application data messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The messaging server device 620 may execute processing operations or logic for the application data messaging system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The messaging server device 620 may execute communications operations or logic for the application data messaging system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The messaging server device 620 may communicate with other devices 610, 650 over a communications media 612 using communications signals 614 via the communications component 640. The devices 610, 650 may be internal or external to the messaging server device 620 as desired for a given implementation.

The centralized system 600 may correspond to an embodiment in which a single messaging server 180 is used executing on a single messaging server device 620. The devices 610, 650 may correspond to client devices—such as recipient client device 120 and sender client device 190—using the messaging server 180 for messaging services.

Figure 7:
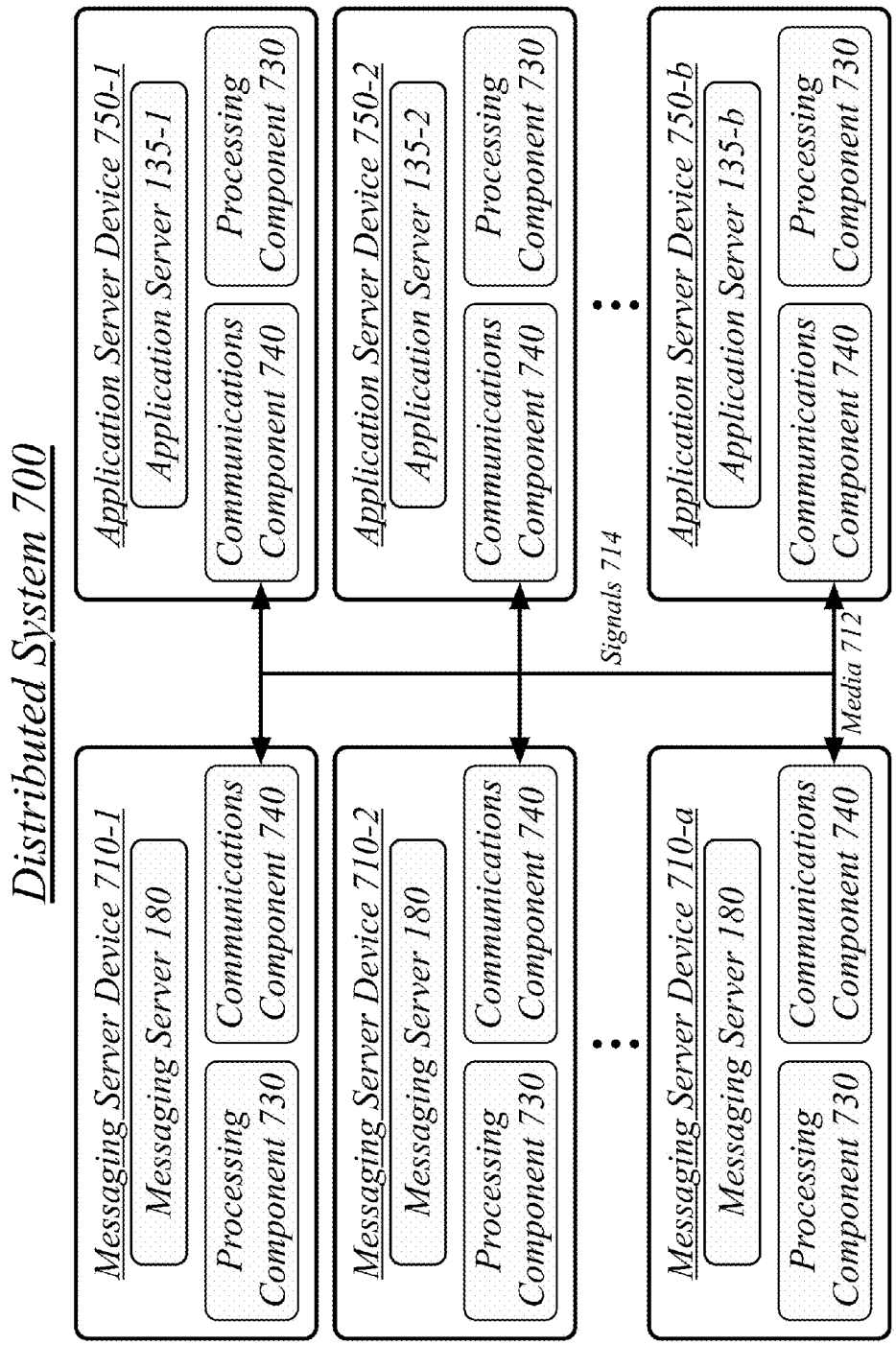
FIG. 7 illustrates an embodiment of a distributed system for the system of FIG. 1.

FIG. 7 illustrates a block diagram of a distributed system 700. The distributed system 700 may distribute portions of the structure and/or operations for the application data messaging system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a messaging server device 710 and an application server device 750. In general, the server devices 710, 750 may be the same or similar to the centralized messaging server device 620 as described with reference to FIG. 6. For instance, the server devices 710, 750 may each comprise a processing component 730 and a communications component 740 which are the same or similar to the processing component 630 and the communications component 640, respectively, as described with reference to FIG. 6. In another example, the server devices 710, 750 may communicate over a communications media 712 using communications signals 714 via the communications components 740.

The plurality of messaging server devices 710 may comprise or employ one or more client programs that operate to perform various methodologies in accordance with the described embodiments. In one embodiment, for example, the plurality of messaging server devices 710 may collectively implement the messaging server 180 as a distributed messaging server 180. Each of the messaging server devices 710 may execute a messaging server 180 to collectively provide messaging services to the users of the media messaging system 100.

The plurality of application server devices 750 may comprise or employ one or more server programs that operate to perform various methodologies in accordance with the described embodiments. In one embodiment, for example, the plurality of application server devices 750 may implement the application servers 135.

Figure 8:
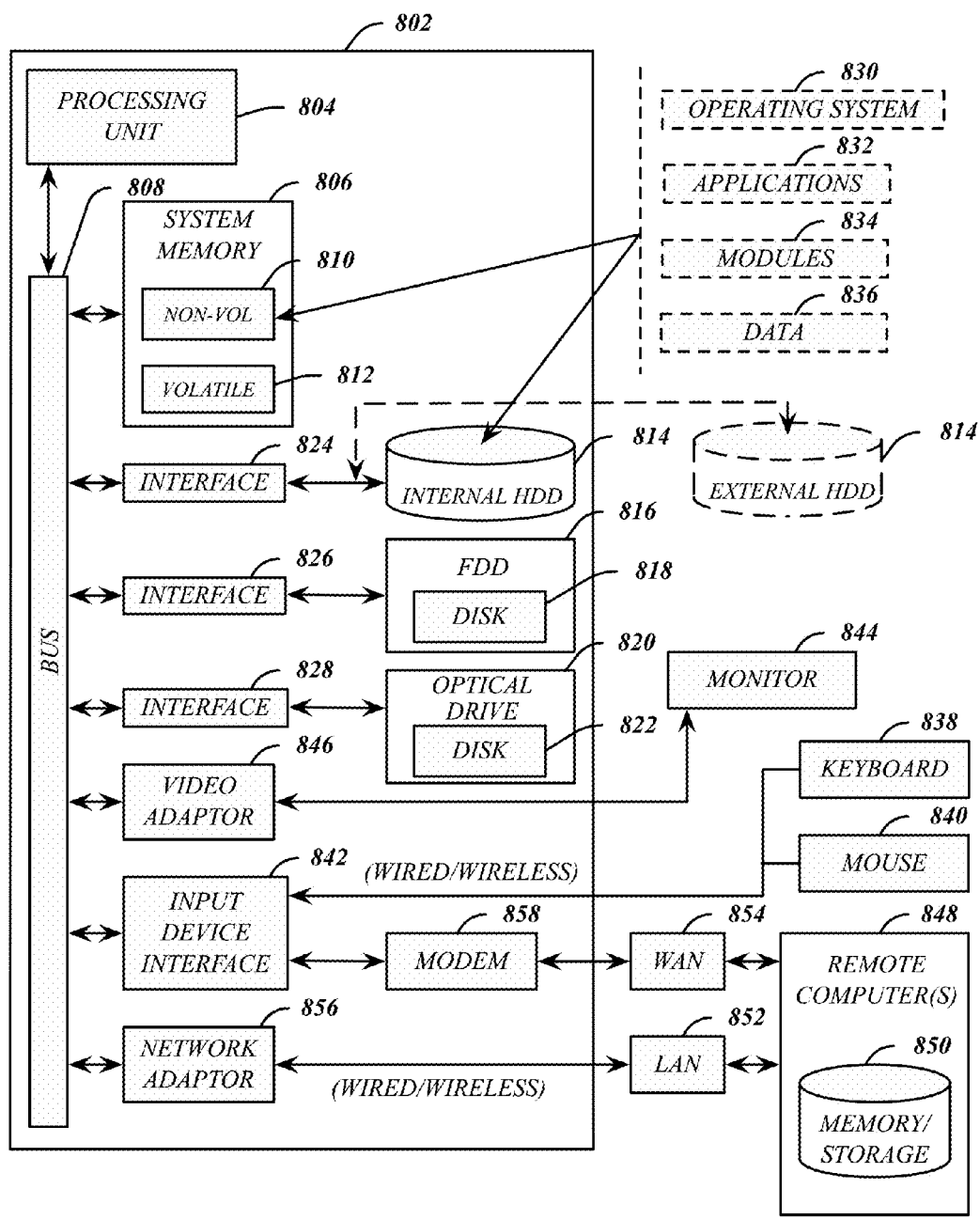
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 6 and FIG. 7, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the application data messaging system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
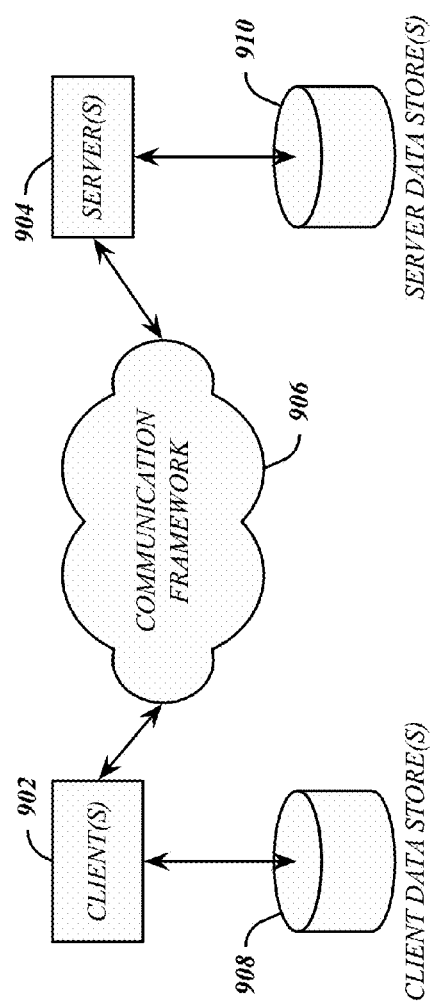
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the first server device 910. The servers 904 may implement the second server device 950. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
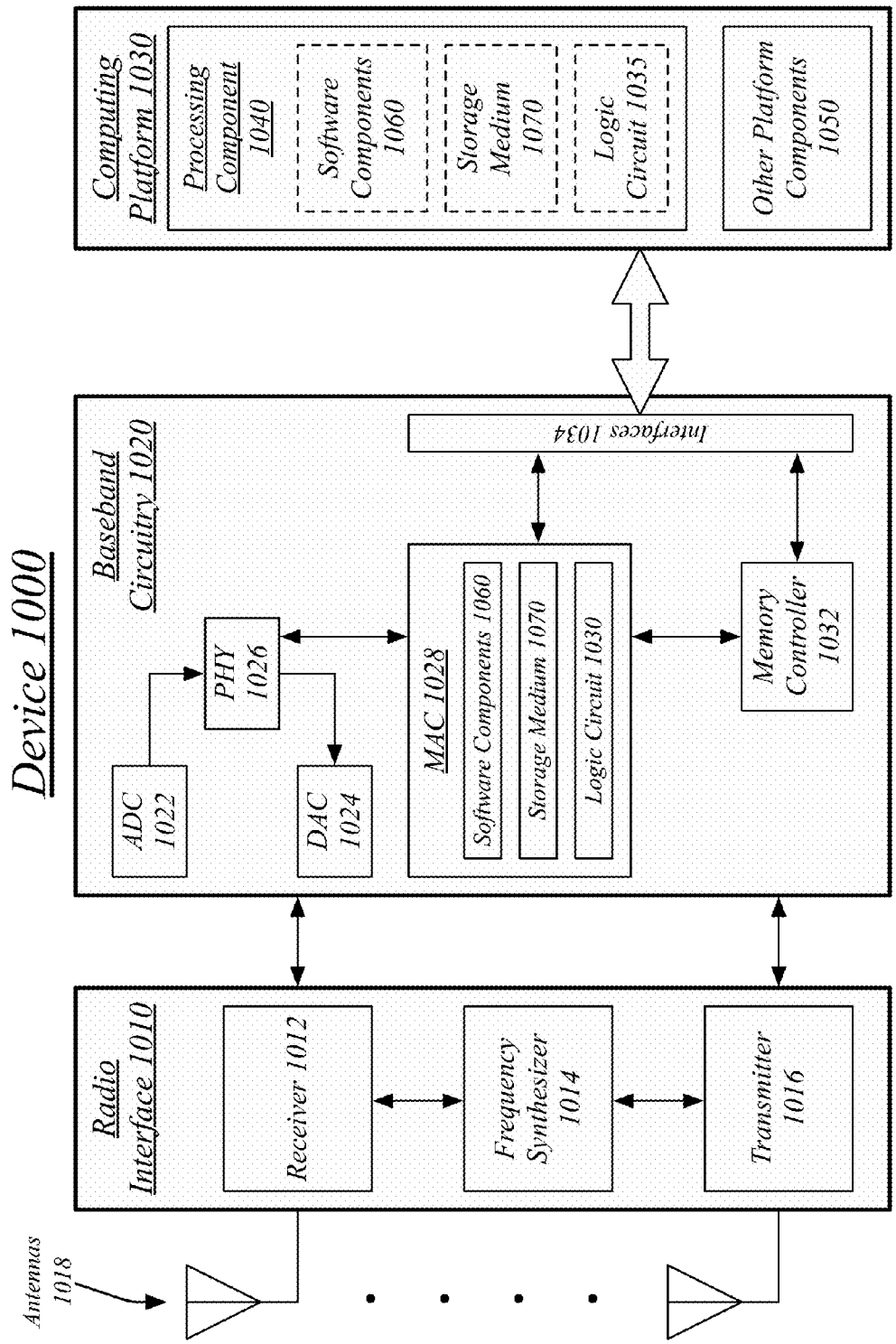
FIG. 10 illustrates an embodiment of a radio device architecture.

FIG. 10 illustrates an embodiment of a device 1000 for use in a multicarrier OFDM system, such as the application data messaging system 100. Device 1000 may implement, for example, software components 1060 as described with reference to application data messaging system 100 and/or a logic circuit 1035. The logic circuit 1035 may include physical circuits to perform operations described for the application data messaging system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the application data messaging system 100 and/or logic circuit 1035 in a single computing entity, such as entirely within a single device. Alternatively, the device 1000 may distribute portions of the structure and/or operations for the application data messaging system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the application data messaging system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a message package from a messaging service at a messaging client on a client device, the message package addressed from a source messaging account and addressed to a recipient messaging account, the recipient messaging account associated with the messaging client on the client device; extracting an application data payload from the message package; receiving an application service recommendation package from the messaging service, the application service recommendation package comprising an application service identifier; and transmitting at least a portion of the application data payload to a recommended application service by the messaging client, the recommended application service identified by the application service identifier.

A computer-implemented method may further comprise displaying a service recommendation on a display device for the client device, the service recommendation corresponding to the application service identifier; and receiving a user command, the user command indicating selection of the service recommendation.

A computer-implemented method may further comprise the application service recommendation package comprising a plurality of application service identifiers including the application service identifier, further comprising: displaying a plurality of service recommendations on the display device for the client device, the plurality of service recommendations corresponding to the plurality of application service identifiers; and receiving a user commend, the user command indicating selection of the service recommendation corresponding to the recommended application service.

A computer-implemented method may further comprise the application data payload operative to configure the recommended application service as to context of a messaging conversation between the source messaging account and the recipient messaging account.

A computer-implemented method may further comprise the portion of the application data payload generated by the recommended application service for the source messaging account.

A computer-implemented method may further comprise the application service recommendation specified by the messaging service based on the application data payload.

A computer-implemented method may further comprise the application data payload comprising at least one of time information, location information, and event information.

A computer-implemented method may further comprise the application data payload comprising at least time information and location information, the recommended application service comprising a transportation application service, the application service recommendation package comprising a transportation application service recommendation based on the application data payload comprising the time information and the location information.

A computer-implemented method may further comprise the message package comprising a media item, the application data payload comprising keyword information for the media item, the recommended application service comprising a media application service, wherein transmitting the application data payload to the media application service configures the media application service for the retrieval of a plurality of media items based on the keyword information.

A computer-implemented method may further comprise the application data payload comprising gameplay information for a game application, the recommended application service comprising the game application, the gameplay information operative to configure the game application as to participation by the sender messaging account in gameplay of the game application.

A computer-implemented method may further comprise receiving an application data item from the recommended application service in response to transmitting at least the portion of the application data payload to the recommended application service; and transmitting a second message package to the messaging service, the second message package including the application data item in an updated application data payload.

An apparatus may comprise a processor circuit on a client device; a network interface controller on a client device; a messaging component operative on the processor circuit to receive a message package from a messaging service at a messaging client on a client device via the network interface controller, the message package addressed from a source messaging account and addressed to a recipient messaging account, the recipient messaging account associated with the messaging client on the client device; extract an application data payload from the message package; receive an application service recommendation package from the messaging service, the application service recommendation package comprising an application service identifier; and an application interoperation component operative on the processor circuit to transmit at least a portion of the application data payload to a recommended application service by the messaging client, the recommended application service identified by the application service identifier. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a message package from a messaging service at a messaging client on a client device, the message package addressed from a source messaging account and addressed to a recipient messaging account, the recipient messaging account associated with the messaging client on the client device;
extracting an application data payload from the message package;
receiving an application service recommendation package from the messaging service, the application service recommendation package comprising a plurality of application service identifiers that indicate a plurality of recommended application services for use in handling the application data payload;
displaying the plurality of recommended application services on the display device for the client device, the plurality of recommended application services corresponding to the plurality of application service identifiers;
receiving a user command, the user command indicating selection of a service recommendation corresponding to a recommended application service; and
transmitting at least a portion of the application data payload to the selected application service by the messaging client.

2. The method of claim 1, the application data payload operative to configure the recommended application service as to context of a messaging conversation between the source messaging account and the recipient messaging account.

3. The method of claim 1, the application service recommendation specified by the messaging service based on the application data payload.

4. The method of claim 1, the application data payload comprising at least time information and location information, the recommended application service comprising a transportation application service, the application service recommendation package comprising a transportation application service recommendation based on the application data payload comprising the time information and the location information.

5. The method of claim 1, the message package comprising a media item, the application data payload comprising keyword information for the media item, the recommended application service comprising a media application service, wherein transmitting the application data payload to the media application service configures the media application service for the retrieval of a plurality of media items based on the keyword information.

6. The method of claim 1, further comprising:
receiving an application data item from the recommended application service in response to transmitting at least the portion of the application data payload to the recommended application service; and
transmitting a second message package to the messaging service, the second message package including the application data item in an updated application data payload.

7. An apparatus, comprising:
a processor circuit on a client device; a network interface controller on a client device;
a messaging component operative on the processor circuit to receive a message package from a messaging service at a messaging client on a client device via the network interface controller, the message package addressed from a source messaging account and addressed to a recipient messaging account, the recipient messaging account associated with the messaging client on the client device; extract an application data payload from the message package; receive an application service recommendation package from the messaging service, the application service recommendation package comprising a plurality of application service identifiers that indicate a plurality of recommended application services for use in handling the application data payload;
an application interoperation component operative to:
display the plurality of recommended application services on the display device for the client device, the plurality of recommended application services corresponding to the plurality of application service identifiers;
receive a user commend, the user command indicating selection of a service recommendation corresponding to a recommended application service; and
transmit at least a portion of the application data payload to the selected application service.

8. The apparatus of claim 7, the application data payload operative to configure the recommended application service as to context of a messaging conversation between the source messaging account and the recipient messaging account.

9. The apparatus of claim 7, the application service recommendation specified by the messaging service based on the application data payload.

10. The apparatus of claim 7, the application data payload comprising at least time information and location information, the recommended application service comprising a transportation application service, the application service recommendation package comprising a transportation application service recommendation based on the application data payload comprising the time information and the location information.

11. The apparatus of claim 7, the message package comprising a media item, the application data payload comprising keyword information for the media item, the recommended application service comprising a media application service, wherein transmitting the application data payload to the media application service configures the media application service for the retrieval of a plurality of media items based on the keyword information.

12. The apparatus of claim 7, further comprising:
the application interoperation component operative to receive an application data item from the recommended application service in response to transmitting at least the portion of the application data payload to the recommended application service; and
the messaging component operative to transmit a second message package to the messaging service, the second message package including the application data item in an updated application data payload.

13. At least one non-transitory computer-readable storage medium comprising instructions that, when executed, cause a system to:
receive a message package from a messaging service at a messaging client on a client device, the message package addressed from a source messaging account and addressed to a recipient messaging account, the recipient messaging account associated with the messaging client on the client device;
extract an application data payload from the message package; receive an application service recommendation package from the messaging service, the application service recommendation package comprising a plurality of application service identifiers that indicate a plurality of recommended application services for use in handling the application data payload, the application service recommendations specified by the messaging service based on the application data payload;
display the plurality of recommended application services on the display device for the client device, the plurality of recommended application services corresponding to the plurality of application service identifiers;
receive a user command, the user command indicating selection of a service recommendation corresponding to a recommended application service and
transmit at least a portion of the application data payload to the selected application service by the messaging client.

14. The computer-readable storage medium of claim 13, the application data payload operative to configure the recommended application service as to context of a messaging conversation between the source messaging account and the recipient messaging account.

15. The computer-readable storage medium of claim 13, the application data payload comprising at least time information and location information, the recommended application service comprising a transportation application service, the application service recommendation package comprising a transportation application service recommendation based on the application data payload comprising the time information and the location information.

16. The computer-readable storage medium of claim 13, the message package comprising a media item, the application data payload comprising keyword information for the media item, the recommended application service comprising a media application service, wherein transmitting the application data payload to the media application service configures the media application service for the retrieval of a plurality of media items based on the keyword information.

17. The computer-readable storage medium of claim 13, comprising further instructions that, when executed, cause a system to:
receive an application data item from the recommended application service in response to transmitting at least the portion of the application data payload to the recommended application service; and
transmit a second message package to the messaging service, the second message package including the application data item in an updated application data payload.

\* \* \* \* \*